United States Patent [19]

Schuster

[11] 4,256,539

[45] Mar. 17, 1981

[54] METHOD OF GENERATING GAS AND COKE DUST BY RAPID DEGASIFICATION AND RAPID VAPORIZATION

[75] Inventor: Ernst Schuster, Gummersbach, Fed. Rep. of Germany

[73] Assignee: L. & C. Steinmüller GmbH, Gummersback, Fed. Rep. of Germany

[21] Appl. No.: 894,858

[22] Filed: Apr. 10, 1978

[30] Foreign Application Priority Data

May 14, 1977 [DE] Fed. Rep. of Germany ....... 2721997

[51] Int. Cl.$^3$ ..................... C10B 49/16; C10B 57/00; C10B 49/20
[52] U.S. Cl. .................................. 201/9; 60/39.18 R; 201/17; 201/22; 201/28; 201/31; 201/44; 201/12
[58] Field of Search ........ 60/39.12, 39.18 R, 39.18 B; 201/9, 17, 26, 27, 44, 12, 10, 22, 28, 31

[56] References Cited

U.S. PATENT DOCUMENTS

| | | | |
|---|---|---|---|
| 1,937,552 | 12/1933 | Davis, Jr. | 60/39.12 UX |
| 2,706,706 | 4/1959 | Pettyjohn | 201/17 X |
| 3,047,472 | 7/1962 | Gorin et al. | 201/26 X |
| 3,734,833 | 5/1973 | Singh | 201/26 X |
| 3,736,233 | 5/1973 | Sass et al. | 201/17 |
| 3,759,739 | 9/1973 | Whitten et al. | 201/17 X |
| 3,986,348 | 10/1976 | Switzer, Jr. | 60/39.12 |
| 3,991,557 | 11/1976 | Donath | 60/39.18 B |
| 4,002,535 | 1/1977 | Albright et al. | 201/9 |
| 4,058,974 | 11/1977 | Pfenninger | 60/39.12 |
| 4,102,773 | 7/1978 | Green et al. | 201/17 X |
| 4,162,943 | 7/1979 | Green | 201/26 X |
| 4,162,959 | 7/1979 | Duraiswamy | 201/17 X |

*Primary Examiner*—Frank W. Lutter
*Assistant Examiner*—Roger F. Phillips
*Attorney, Agent, or Firm*—Becker & Becker, Inc.

[57] ABSTRACT

A method of generating gas and coke dust by means of rapid degasification and rapid vaporization, with simultaneous extensive desulfurization, of coal ground into dust. In a first step, one portion of coal is subjected to complete or partial vaporization. In a second step, which immediately follows the first step, another portion of coal is subjected to degasification in the same or in associated reaction chambers. In the degasification, the solid and gaseous products obtained during the vaporization which are at a higher temperature level than that of the degasification step, transfer heat directly to the coal introduced into the degasification step, thus for covering the heat required for the degasification.

5 Claims, No Drawings

METHOD OF GENERATING GAS AND COKE DUST BY RAPID DEGASIFICATION AND RAPID VAPORIZATION

The present invention relates to a method of generating gas and coke dust by means of rapid degasification and rapid vaporization, with simultaneous extensive desulfurization, of coal ground to dust.

Proposals have heretofore been made for generating gas and coke dust and, in addition to burning these in gas turbines and steam generators with subsequent utilization of the steam in steam turbines, also using them for the generation of current. Pursuant to these proposals, the gas is burned in gas turbine firing equipment, and the exhaust, after performing work in the gas turbine, passes to the steam generator, where it serves as air for combustion for the fuel which is introduced there. The combination of gas turbine and steam turbine processes is chosen because this process results in an overall effectiveness or output of the power plant which is better in several respects than that output achieved with the normal steam turbine process. Among the known proposals is the additional gas generation within the power plant for use of the gas outside of the power plant, for example as synthesis gas in the chemical industry or as gas for the general gas supply after appropriate conversion.

Proposals for such combinations, together with a gas generation within the power plant, are differentiated from one another in that, on the one hand, the coal used in the power plant is completely vaporized prior to the combustion and after purification is supplied to the gas turbine and/or the steam generator, and on the other hand, the coal which is used is partially vaporized or at least degasified, and the thereby remaining coke dust (lump coke would not be usable for large steam generators) is burned in the steam generator, while the gas follows the normal course through gas purification to the gas turbine or the steam generator.

With the complete vaporization of the coal in the power plant, the entire power plant is put out of commission if the gas generating equipment breaks down; this occurs since the steam generator is generally designed for only one gas firing equipment, as the case may be, even under pressure. For the operating reliability of the power plant, it therefore appears advisable only to degasify or partially vaporize the coal which is to be used; this is done in order to only recover the quantity of gas which will suffice for the operation of the gas turbine and, as the case may be, for requirements outside the plant. The remaining coke dust is burned in the steam generator. If the gas generating equipment breaks down, it would be possible to operate the steam generator with a supply of sulfur-poor coal; this is done so that the entire power plant output would not be lost but rather only about 4/5 thereof. With complete vaporization, the greatest quantity of gas is obtained. In this connection, however, the gas purification plants also require correspondingly high investments.

If the complete vaporization of the coal dust is to be effected in less than one second, temperatures of about 1600° C. are required. These temperatures can only be obtained with oxygen. However, oxygen is expensive, and the generated gas would be too valuable to be burned in firing equipment. Vaporization with air only results in temperatures which are about 200° C. less, even with still economically feasible high preheating of air, coal dust, and, if necessary, steam. For complete vaporization, therefore, vaporization times are required which are several times greater than that required with oxygen vaporization. This leads to a corresponding increase in size of the reaction chamber and therefore an increase in cost.

Methods were also proposed according to which degasification and partial vaporization are carried out in one step. To cover the heat requirement, a portion of the coal is burned with air or oxygen. The addition of steam is of course also possible. Partial vaporization with air results in heating values of the gas of generally less than 1200 Kcal/Nm$^3$. This heating value can potentially cause difficulties during combustion, especially if it is only of an order of magnitude of 1000 Kcal/Nm$^3$ and less. These difficulties are especially evident in the gas turbine and with the use of the waste air as air for combustion in the subsequent steam generator. With the use of oxygen, as already described in the previous paragraph, the generated gas becomes too valuable to burn in firing equipment.

Methods are also known for rapid degasification, according to which the heat requirement is covered by partial combustion of coal constituents, such as gas, tar, etc., or also the carbon itself. If a partial combustion of the coal is carried out with air, heat values which again are about 1200 Kcal/Nm$^3$ gas and less are obtained; these heating values are possibly insufficient for subsequent use. If gas recovered from the coal is resupplied as heating gas to the degasification, and then this gas is partially burned prior to introduction into the reaction chamber, somewhat more favorable values result. These values are about 1200 to 1600 Kcal/Nm$^3$. It would be better if the partial combustion were carried out with oxygen. The use of oxygen, however, appears to be expedient only if the gas obtained is to be used for purposes other than combustion.

Known also is degasification with the aid of solid heat carriers, either in the fill or during the degasification of the dust. Hot generated coke dust, if necessary heated up further by partial combustion, is added either alone or together with a heating gas to the coal which is to be degasified, so that heating values result which are much higher than those resulting with previous methods. However, the resupply of coke dust must take place in a specific proportion of coke dust to the coal dust. At a minimum, this proportion is about 3 to 4 times as much. At a maximum, this proportion is nearly thirty times as much, depending upon the degasification temperature and the type of coal. For this purpose, accordingly, a certain power is necessary to overcome the pressure drop, etc.

In addition to generating gas and current, the power plant must satisfy certain regulations before it can convey material into the atmosphere. Included among these regulations is the limitation of the discharge of SO$_2$ which depends upon the size of the power plant. To remove the sulfur from the power plant, different proposals are again known. One such proposal is flue gas desulfurization, whereby the sulfur dioxide is first removed from the flue gas which results during combustion. According to another proposal, the sulfur is removed directly from the coal, for example during the rapid degasification and/or rapid partial vaporization whereby the largest portion of the sulfur is converted into the gaseous state. The flue gas desulfurization is much more expensive than the direct removal of the sulfur from the coal. Additionally, flue gas desulfurization still pollutes the environment by the generation of further products that must be stored without commercial value.

With the known methods for removing sulfur directly from coal, by degasification or by partial vaporization of coal dust, the hydrogen sulfide content in the carrier agent that conveys the dust through the reaction chamber plays a significant role. This hydrogen sulfide content depends upon the temperature and must be that much lower the higher the desulfurization or partial vaporization temperature. However, since the resulting quantity of gas for all practical purposes is predetermined, the hydrogen sulfide content in the generated gas is thereby also predetermined; consequently, certain temperatures should not be exceeded.

It is therefore an object of the present invention to improve the gas heating value and the degree of desulfurization by improving the degasification and vaporization conditions as well as by accommodation of the temperature portions.

The method of the present invention is characterized primarily in that, as a second step, in the same chamber or in connected chambers, a degasification immediately follows the first step of complete or partial vaporization. In the degasification, the solid and gaseous products obtained during the vaporization are at a higher temperature level than that of the degasification step; these products transfer heat directly to the coal introduced into the degasification step for covering the degasification heat.

Every type of coal has a specific temperature at which the desulfurization involving the withdrawal of the sulfur from the coal with the aid of hydrogen is most favorably effected whereby the resulting coke dust has the least sulfur content. In general, with a flow-through of a fine coal fill having a treatment gas which contains hydrogen, this temperature is between 750° C. and 1000° C. With very rapid heating-up to the rapid degasification and rapid partial vaporization, these temperatures are potentially increased. By means of the oxidizing atmosphere which is present for a short time, the desulfurization process might even be hindered somewhat. However, with the vaporization of coal dust with air, for example, if an efficiency of, for example, 25 to 50% is desired, temperatures of 1250° C. to 1400° C. must be used. These are temperatures especially due to the hot coke dust which can again lead to the decomposition of the just formed hydrogen sulfide and to the accumulation of the sulfur on the coke dust. The time span of the very high temperatures should therefore be kept as short as possible. Moreover, lower temperatures would aid the separation of coke dust and gas, in addition to reducing the cost of the subsequent plants. If, for example, coal at 450° C. temperature, for example, comes out of the previous rapid oxidation step and is injected together with air at 700° C. into a reaction chamber of a rapid partial vaporization, a coal having 30% volatile constituents and undergoing a partial vaporization of the fixed carbon portion of 50% to 55% at 1350° C. in about one second, results in a quantity of gas and coke dust sufficient to heat up 2½ times the quantity of coal from 450° C. to 950° C. by direct heat transfer. For this purpose, coal dust at 450° C. temperature coming, for example, from the rapid oxidation step in the form of a free stream and in the direction of the flowing medium from the vaporization, is blown into the middle of the generally round reaction chamber after the conclusion of the partial vaporization; this coal dust is heated up from 450° C. to about 950° C., and in the subsequent degasification stage, usually in less than three seconds, is degasified to a residual volatile content of less than 2% accordingly, the coal dust is desulfurized, for example from an initial sulfur content of 1.1% to a sulfur content in the coke of less than 0.6%. This sulfur content of the coke would be sufficient in order to charge the steam generator of an 800 MW unit merely with coke dust while taking into account the regulations for keeping the air clean. The additional use of purified gas from the coal, either from the degasification and/or the partial vaporization, through the gas turbine or directly in the steam generator, would still further reduce the discharge of sulfur dioxide.

Pursuant to the present invention, the above described procedure would allow adjustment of the temperature appropriate for the desulfurization. The temperature drop of for example 1350° C. to 950° C. would also considerably ease the problem of the subsequent separation of gas and coke dust. Additionally, the temperature drop would considerably improve the heat economy of the entire process by means of the direct recycling of heat from the degasification and vaporization products to the media which are to be newly introduced.

The partial combustion of coal, be it with air or with oxygen, potentially has a restraining effect on the release of the sulfur from the coal. Existing experience seems to support this observation. In order to handle this difficulty, it is further proposed, pursuant to the present invention, that after the degasification step a separation of gas and coke dust be effected; the gas is conveyed for gas purification after being cooled off; the coke dust, if necessary after being cooled off, is supplied for further use, for example for being fired in a steam generator, but at least partially for use in a vaporization step; subsequently the gaseous and solid products obtained during the vaporization, at a higher temperature level than that of the degasification step, are conveyed to the degasification step as heat carriers for direct heat transfer to cover the degasification heat for the coal dust which is to be degasified.

Pursuant to the present invention, a gas comprising a mixture of degasification and vaporization gas is conveyed to the degasification step at, for example, 1350° C. In case the remaining coke dust from the vaporization step is not brought back along with the gas to the degasification step, the coal which could possibly be introduced there is reduced by about 10 to 15%. The degasification, with extensive simultaneous desulfurization, as a function of the degasification temperature, requires less than six seconds, and usually less than three seconds. After the degasification, coke dust and gas, a mixture gas from degasification and vaporization, are separated from one another. The gas, after giving off its heat to media required in the process or in associated processes, undergoes gas purification and, if necessary, conversion. Part of the coke dust goes to the steam generator and/or other places of utilization. The other part of the coke dust goes to the vaporization step, where further preheated vaporization media, such as air, oxygen, steam, etc., are simultaneously introduced. The unreacted coke dust in the vaporization in a portion determined by the amount of gas required for the degasification, etc. goes, as the case may be after cooling, to further places of use, for example to the firing equipment of the steam generator. The vaporization gas is supplied to the degasification step whereby, prior to entry into the degasification step, still further temperature increases can be effected, if necessary, by partial combustion.

The advantage of the present invention consists in that the coal dust is first only degasified, as a result of which the best desulfurization is obtainable, and futhermore, in that the vaporization step contains a coke dust which already has a very high temperature, for example, 950° C. In this way, the partial combustion of the coke is correspondingly reduced. Thereby, for example with air vaporization, the air requirement is less and the amount of nitrogen in the resulting vaporization gas is less, thus improving the heating value. During the degasification, gases are given off by the coal. These gases can have a heating value of from 3500 to nearly 10,000 Kcal per $Nm^3$ gas, depending upon the degasification time and temperature. As a further advantage, a variable accommodation of the heating value, at least in the range of 1200 to 2000 Kcal per $Nm^3$ mixture gas, results with the use of air vaporization. With the use of oxygen for partial vaporization, these heating values are correspondingly higher, since in this instance the nitrogen portion of the air is not present.

It is further proposed pursuant to the present invention, that, after the vaporization step, a separation of gas and coke dust be effected. At least a portion of the coke dust, if necessary after cooling, is supplied for further use, for example as fuel for a steam generator. The remaining portion of the coke dust, together with at least a portion of the gas, is recycled to the degasification step as heat carrier. In so doing, it would not only be possible to recover two different types of gas, on the one hand the gas from the air or oxygen partial vaporization, and on the other hand a gas mixture of vaporization gas and degasification gas. It would also be possible to achieve a flexible accommodation to the operating conditions.

Of course, in the individual stages or steps of the vaporization and degasification, oxygen enriched air as well as steam could also be introduced instead of air or oxygen.

It is further proposed pursuant to the present invention that, when interposing a rapid oxidation step prior to the degasification or vaporization step for reducing the capacity of the coal to cake, at least a portion of the gaseous and, as the case may be, also solid products of the degasification and/or vaporization steps are used to directly heat up the coal dust to the temperature required for the rapid oxidation step. These products are used as a heat carrier.

Pursuant to the basic or underlying idea of the present invention, it is possible not only to save the cost of preheaters for indirectly heating up the coal dust prior to its entry into the rapid oxidation. It is also possible to transfer a maximum amount of the heat contained in the degasification and vaporization products directly to the media required in the process. Consequently considerable simplification of the plant structure and the material requirements results.

A further advantage of the present invention, in addition to improving the heat value and the degree of desulfurization, is the reduction of the amount of gas with the same degree of desulfurization. An extensive direct utilization of the sensible heat contained in the products occurs, so that on the whole, the plant structure to be used can be produced more economically.

The present invention is, of course, in no way limited to the specific disclosure of the specification, but also encompasses any modifications within the scope of the appended claims.

What I claim is:

1. A method of generating gas and coke dust from coal dust with simultaneous desulfurization of coal dust, the method comprising the steps of:

vaporising one portion of the coal dust by rapidly heating said portion of coal dust to a vaporization temperature and converting the coal dust to a mixture of gaseous and solid products including coke dust, degasifying and desulfurizing a second portion of the coal dust by directly transferring heat from the gaseous and solid products of said vaporizing step to a second portion of the coal dust by conveying the products to the second portion of the coal dust for heating the second portion to a temperature less than the vaporization temperature but sufficiently high for degasifying and desulfurizing the second portion and converting the second portion to produce gas and coke dust.

2. A method according to claim 1 in which the steps of heating to vaporization temperature and degasifying occur in a common reaction chamber.

3. A method according to claim 1 in which at least one of said portions of coal dust is rapidly oxidized prior to vaporization or degasification to reduce its caking tendency.

4. A method according to claim 1, further including the steps of:

separating the gas and coke dust produced during said degasification step;

cooling and purifying said gas for other uses, and supplying a part of said coke dust for firing a boiler.

5. A method according to claim 4, which further includes the step of cooling off said coke dust after separation of said gas from said coke dust.

* * * * *